April 15, 1952   W. B. STODDARD, JR   2,592,614
METHOD OF MAKING TUBULAR METALLIC WAVE GUIDES
Filed Jan. 8, 1946
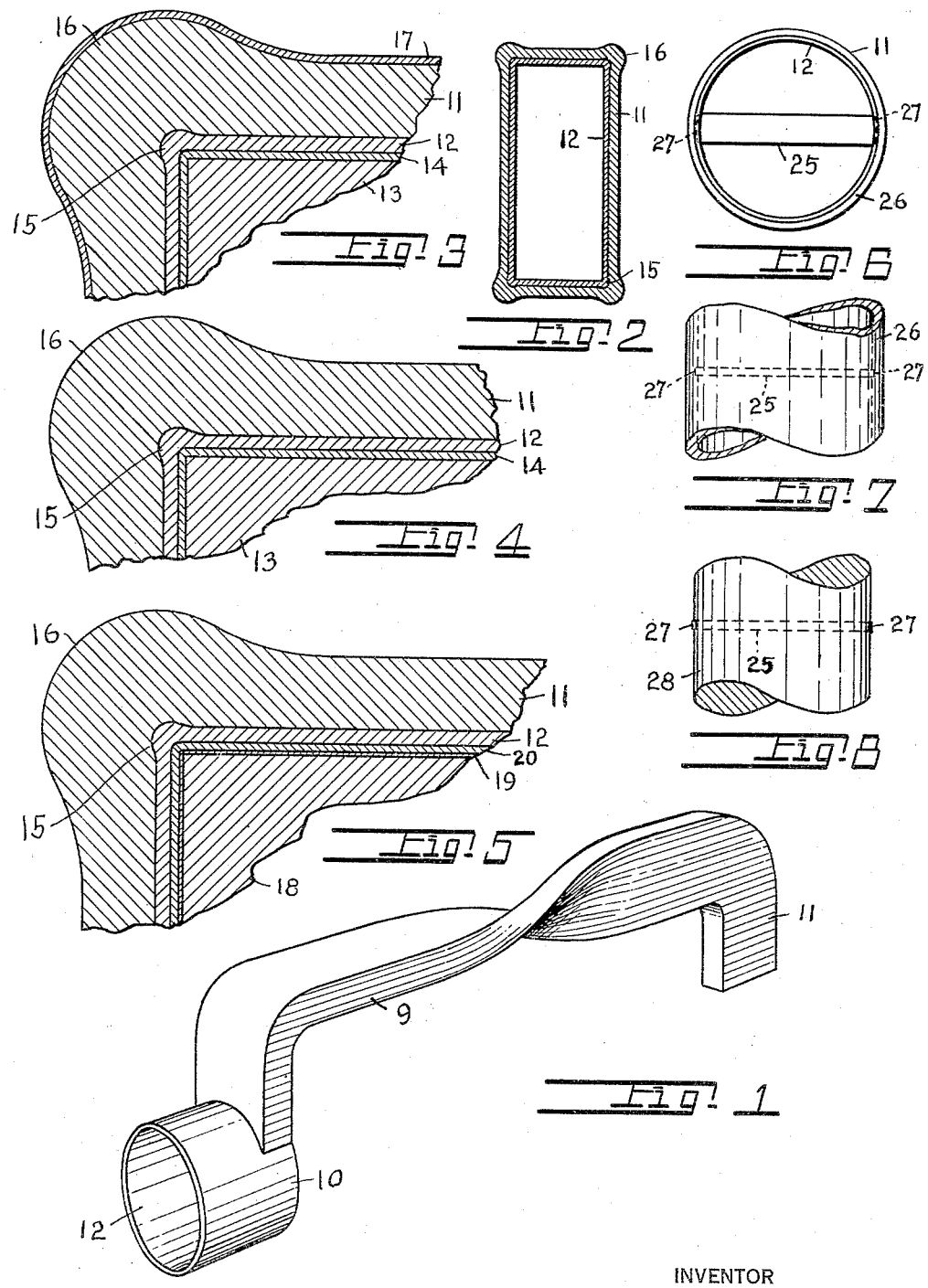
INVENTOR
*William B. Stoddard, Jr.*
BY *Frederick G. L. Boyer*
ATTORNEY Patented Apr. 15, 1952

2,592,614

UNITED STATES PATENT OFFICE 2,592,614

METHOD OF MAKING TUBULAR METALLIC WAVE GUIDES

William B. Stoddard, Jr., Hamilton, Ohio, assignor to The Champion Paper and Fibre Company, Hamilton, Ohio, a corporation of Ohio Application January 8, 1946, Serial No. 639,871

13 Claims. (Cl. 204—9)

This invention relates to tubular wave guides such as are used in radar equipment, and to methods of producing the same. Such wave guides are made of metal and may be either uniform or variable in cross sectional form and dimension. They are frequently long and slender in form and are often required to have curved, twisted, and other more or less irregular shapes. The interior surfaces should be smooth and free from even small projections, lumps, or pits. They are advantageously of high finish and good electrical conductivity and for this reason are commonly specified to be of silver.

Such tubular wave guides have heretofore been produced in various ways and the resulting products have varied in character and quality in accordance with the methods used in their production. Silver clad strips have been spiral wound with the silver on the inside, and silver soldered to form a tube. Alternatively, silver clad metal has been drawn into tubing which is subsequently bent into the desired form. Otherwise tubes have been formed by casting, extrusion, drawing, machining grooves in solid metal and silver soldering the fourth side in place, or by electroforming copper on a graphite coated wax core in a manner similar to the well known method of making electrolytes. Wave guides made by such processes seldom had the desired character of interior surface unless subjected to an interior finishing operation. In tubes of rectangular cross section this surface was sometimes burnished by forcing tightly fitting rollers through the tube. The inside of tubular wave guides made of base metals was commonly coated with a thin layer of silver by chemical or electrochemical precipitation processes. Since it is extremely difficult to deposit significant thicknesses or uniform and continuous layers of silver inside of such tubular bodies, particularly those which have sharp interior angles or which are narrow in cross section or long and slender or irregular in shape, the silver layers applied in practice were often imperfect and usually much less in thickness than the 0.0005 inch minimum commonly specified. The bending and twisting required to form tubes into the shapes specified for wave guides has also been a source of considerable difficulty. The maintenance of the cross sectional form and dimensions at the bends has been particularly difficult and the thickness and physical properties of the walls were materially altered by cold bending. The prior processes were not adapted to the production of the required irregular forms in one piece and it has accordingly been necessary to form wave guides in relatively short sections which have then had to be silver soldered or otherwise fastened together. Sharp bends in particular have frequently been made by silver soldering together short sections of straight tubing cut at suitable angles. Soldering processes and the like, however, frequently left frozen droplets of metal on the inside of the tube, seriously impairing the functioning of the guide. For these and other reasons, wave guides made by the heretofore known processes such as those enumerated, were of high cost or poor quality or both, and uneconomically large percentages had to be rejected for failure to meet the exacting requirements.

Further, I have found that attempts at electroformation, in accordance with known methods, or metallic cores which were subsequently removed by fusion or by solution in chemical reagents, failed to produce objects with the clean, smooth, continuous, highly-finished interior surfaces desired in wave guides, no matter how smooth and highly polished the surface of the core on which deposition was made. It is not known whether this is due to a roughening of the core surface before the initial deposit of metal is formed thereon, or to damage to the inside surface taking place during solution or fusion and removal of the core metal.

One object of the present invention is to provide a tubular metallic wave guide of straight, curved, or twisted form as required, and of uniform or varying cross sectional shape and dimensions, of improved characteristics, of strength and rigidity adequate to resist the vibratory and other stresses to which it may be subjected in use, but without excess weight, which wave guide shall have a smooth continuous uniformly high finished silver lining of appreciable and substantially uniform thickness, which is integral with a wall of stronger and more rigid metal, the whole being free from longitudinal seams and joints. An allied object is to provide a relatively low cost method of electrolytically forming such wave guides of the required regular or irregular shape, by which the desired smooth and highly finished interior surfaces can be provided without the necessity of any polishing operation on the inside of the tubular body, and by which they can be made with substantially uniform wall thickness and produced with a high degree of dimensional accuracy, and by which this accuracy can be repeated to render the parts interchangeable. Other and more detailed objects and advantages of the invention will be made apparent by the following detailed description.

To accomplish these objects I first deposit the metallic lining of the wave guide on a destructible metal core and thereover deposit the metal of the wall structure. I have also found that if a continuous layer of copper is formed over the highly polished surface of the core and is either polished or deposited under conditions to give a bright plate, the copper remains on the inner surface of the wave guide after the removal of the core, and if the copper layer is then dissolved in a strongly ammoniacal solution of divalent copper, the inner surface of the silver lining is left with a smooth high finish which is substantially identical with that originally provided on the surface of the copper layer which formed the base for the electrodeposition of the wave guide lining. The copper layer is advantageously formed by electrodeposition in the known manner, as copper films formed by chemical precipitation are not in general adequate for the present purpose. The term "continuous" as used in the present specification and claims in describing this copper layer, is to be understood to mean not only freedom from gross discontinuities such as unplated areas, but also freedom from any minute or even microscopic discontinuities which might permit reagents used in destruction of the core or the core metal itself during destruction and removal of the core, to penetrate to, or to cause chemical or physical damage to, the highly finished lining of the wave guide. This term, however, is not to be understood to imply that the copper layer is continuous over, or necessarily covers, those parts of the core where no silver wave guide lining is to be deposited (e. g. the ends of the core) which, as specifically set forth hereinafter, need not receive any copper deposit. The term "strongly ammoniacal" is herein used to define solutions in which ammonia is present in excess of the amount required to form the corresponding copper complex and is advantageously at least 3 to 5 times that amount, that is the ammonia ($NH_3$) is desirably present in an amount at least roughly 3 to 5 times the weight of the divalent copper ($Cu^{++}$). Apparently any of the usual acid radicals may be associated with the ammonia copper complex in the solution. The process of dissolving the copper layer as hereinbefore set forth is, in the present specification and claims, designated as "chemically dissolving" and is to be carefully distinguished from electrolytic or electrochemical processes wherein the solution is accomplished by the application of electrical potential from an external source.

The surface of the core before the formation of the copper layer thereon should be smooth and free from cracks, dents, pinholes, pits, and other surface irregularities. The surface should be, generally, highly polished in order to facilitate the formation thereon of a smooth highly-finished copper layer such as will impart to the innermost surface of the wave guide the smoothness and finish usually specified.

Cores designed to be destroyed by dissolving in chemical reagents, either acids or alkalies, such as cores made of alloys having a zinc, aluminum, or magnesium base, require only to be polished and copper-plated as described. When, on the other hand, it is desired to use cores adapted to be destroyed in situ by fusion, consisting usually of alloys containing considerable proportions of bismuth, it is necessary to prevent the fused core metal from tinning and alloying with the copper layer and thereby interfering with its complete removal from the inner lining of the wave guide. This can be accomplished by treating the fusible core, after polishing and before plating with copper, in a solution characterized by the presence of an acid radical containing a metal chosen from the group consisting of vanadium, chromium, molybdenum, and tungsten, commonly the radical of vanadic, chromic, molybdic, or tungstic acid. This treatment leaves a thin film on the surface of the core, which film is thought to contain a compound of the metal in the acid radical used. This film separates the copper from the fusible core, does not wet with the fused core metal and prevents it from wetting, tinning, or alloying with the copper deposit. Although electrolytic treatments either anodic or cathodic may be preferable when using some fusible alloys, I find that a core composed of metal melting at about 75° C. and containing about 50% bismuth, 35% lead, 9% tin, and 6% cadmium, can be successfully treated, after cleaning, acid dipping, and rinsing, and before copper plating, by dipping the core for about one minute in a solution containing about 25 grams of sodium molybdate per liter, at a temperature between 40° and 50° C. and a pH about 6. The core should then be flashed with cyanide copper and then plated with acid copper till the desired thickness is secured.

In order to secure wave guide structures of the desired strength and rigidity and particularly to combine these properties with the lightness which is desirable for air-borne equipment, I have found it desirable to form the body of the wall structure of nickel electrodeposited over the silver lining, since the physical properties of nickel render it particularly suitable for this purpose.

It is also generally desirable to have the nickel wall thickness, as well as that of the silver lining, substantially uniform. For this reason it is desirable during the electro-formation of the wave guide, to have the current density as nearly uniform as possible in all parts of the surface. This may be accomplished in the known manner by the shape and location of the anodes and by use of non-conducting baffles and conducting "thieves" in suitable locations, when necessary. Electrodeposition, so controlled, results in greater uniformity of thickness and physical properties than is usually secured in tubes bent or formed into the irregular shapes frequently required for wave guides. In the formation of guides having rectangular cross sections the current density at the edges is normally somewhat greater than that over the flat area of the faces. This results in edges of a slightly greater thickness than the flat surfaces. This is the opposite of the condition where the angle has been formed by cold bending, and makes the structure much less liable to fracture along the edges than are those formed by bending without annealing, and much harder and stronger than annealed structures. By this method of production I have been able to produce wave guides in which the thickness of the silver lining is up to the usual specification of 0.0005 inch, or more if desired, and which is nowhere less than 0.0002 inch, an accomplishment which has often been difficult if not impossible with some of the previously used methods of manufacture.

The invention will be more clearly understood by reference to the accompanying drawing, in which:

Fig. 1 is a perspective view of one form of wave guide illustrating the type of bends, twists, changes in cross sectional form, etc., which are commonly required in wave guides.

Fig. 2 is a typical cross section through the rectangular portion of a wave guide such as illustrated in Fig. 1, the thicknesses of the several layers being exaggerated to show the wall structure more clearly.

Fig. 3 is a fragmentary greatly-enlarged cross section showing one corner of an acid soluble metallic core with all of the layers of electrodeposited metal thereon, and ready for the operation of dissolving the core.

Fig. 4 is a similar fragmentary cross section of a core which is to be dissolved in alkali, together with all of the metallic layers electrodeposited thereon, ready for the operation of dissolving the core in alkali.

Fig. 5 is a similar fragmentary cross sectional view of a fusible metal core with all of the electrodeposited metal thereon, and ready for fusion and removal of the core.

Figs. 6 and 7 are end and side views, respectively, of a fragment of a cylindrical portion of a wave guide with an inwardly extending member formed into the side walls.

Fig. 8 is a fragmentary view of the core used in forming the portion of guide illustrated in Figs. 6 and 7, showing how the inwardly extending member is embedded in the core.

Referring to the drawing, Fig. 1 shows a form such as may be required of a wave guide. It is composed of a portion 9 of rectangular and a portion 10 of circular cross section, the former having one 90-degree twist and two 90-degree bends, one each in the plane of the long and the short sides of the rectangle. The exterior layer 11 of nickel is the only part which is visible except at the open end where the silver lining 12 is visible. In Fig. 2 the nickel wall 11 and silver lining 12 are shown in their correct relationship except that the actual thickness of both and the relative thickness of the silver lining are exaggerated so that the multi-layer structure may be clearly seen. It is noted that the thickness of both silver lining and nickel wall is somewhat greater at the corners of the cross section (the edges of the three dimensional body) than on the sides (the faces of the three dimensional body) as and for the reasons already set forth.

The production of the wave guide as illustrated in Figs. 1 and 2 will be made more clear by examination of Fig. 3, which illustrates, in greatly enlarged cross section, one corner of an acid soluble core 13 which may be considered to be formed of a zinc base die casting alloy. The alloy advantageously does not contain copper in any significant amount since copper in the alloy tends to retard the solution of the core. On top of the polished surface of core 13 is the thin layer 14 (greatly exaggerated in thickness in the drawing in order to make it plainly visible) of copper, the surface of which is either brightly polished or deposited as a bright electroplate requiring no further polishing. On top of this is the silver lining 12 (usually specified to be about 0.0005 inch in thickness, which is also greatly exaggerated in the drawing). The greater thickness of this lining along the edges, indicated at 15, is the reverse of the condition which obtains where the silver lining has been electrodeposited on the inside of a preformed tubular body, even when the body is of a size and shape which permits the use of an inside anode.

The nickel layer 11 which is deposited around the silver lining as described is made of whatever thickness may be required to give the necessary strength and rigidity to a wave guide of the particular size and shape being formed. The nickel layer 11, like silver layer 12, is thicker at the edges (i. e. at interior dihedral angles of less than 180 degrees) as indicated at 16 in the figure.

When it is desired to remove the core 13 by dissolving in acid, the outer surface of nickel layer 11 may be conveniently protected by plating with a thin layer of copper 17, if dulling of the surface by immersion in the acid should be objectionable. After deposition of the copper layer, the core with its multi-layer deposit appears as shown in Fig. 3. To give the acid access to the core, the ends of the core are either protected during deposition of the copper or the electrodeposit on the ends is removed before the body is immersed in the acid. After the core 13 is dissolved, the body is immersed in a strongly ammoniacal solution of divalent copper, which dissolves the copper layer 14 from the inside and the copper layer 17 from the outside of the walls, leaving them with the outer layer 11 of nickel and the inner lining 12 of silver as illustrated in Fig. 2.

If it is desired to dissolve the core 13 in alkali, advantageously sodium hydroxide, this can be accomplished with the zinc and aluminum based alloy cores described. As in acid soluble cores, copper-free alloys facilitate solution of the core and for this reason are advantageously used. When the core is to be removed by solution in alkali, the outer copper layer 17 is not necessary for the protection of the nickel during solution of the core, and may be omitted. The core with its multi-layer deposit then appears as is illustrated in Fig. 4 when ready for solution of the core in alkali.

When it is desired to use fusible instead of soluble cores, the core 18 (Fig. 5) is covered as described, with a film or layer 19 by treatment in a solution characterized by the presence of an acid radical containing a metal chosen from the group consisting of chromium, molybdenum, tungsten, and vanadium. On top of this is the copper layer 20, formed as described, which is the same and serves the same purpose as the layer 14. The silver layer 12 and the nickel layer 11 are the same as in the case of the soluble cores.

It is sometimes desired in wave guides to have one or more members extending inwardly from the wall of the guide. For purposes of illustration this is shown in Figs. 6, 7, and 8 as a simple straight cross member 25 extending completely across a circular section 26 of a wave guide. The ends 27 of the cross member 25 are advantageously embedded slightly in the cylindrical wall 26. This is accomplished by embedding the bar 25 in the core 28 as shown in Fig. 8. The ends 27 project slightly, advantageously only a few thousandths of an inch in order to avoid undue interference with the uniformity of the electrodeposits made thereover.

The cores themselves may be formed by any suitable known method. The particular method to be preferred in any instance depends in the well known manner on a combination of factors such as the size and shape of the desired core, the number required to be made, etc. Where the shape is at all complicated and considerable numbers of identical parts are to be made, the well known die casting process has been found advantageous. Usual zinc and aluminum based die casting alloys are satisfactory for the purpose. Inserts such as 25 can be inserted in the finished casting die, in the known manner, before introducing the molten metal into the die.

After formation of the wave guide wall and before the removal of the core, the core furnishes support for the walls of the tubular wave guide so that it can at this stage be handled, stored, or shipped with relative safety. This is also the best time to perform any required machining operations on the body, such as trimming the ends, drilling the walls, etc. When the cores are to be dissolved in acid and an external copper plate is to be used to protect the nickel surface, these machining operations should be performed before applying the copper plate so that the machined surfaces will also be protected.

The invention will be more clearly understood from the following examples:

*Example 1.*—A core similar in shape to the wave guide illustrated in Fig. 1, having rectangular cross section about 0.4 by 0.9 inch, was die cast from a usual zinc base die casting metal. It was carefully inspected for pinholes, cracks, and other surface irregularities. The surface was then carefully polished to give it the degree of smoothness desired on the interior surface of the finished wave guide. After polishing, the core was cleaned cathodically for about 30 seconds in a mildly alkaline cleaning solution adapted for use with zinc base die castings, at a temperature of 185° F. and a current density of about 100 amperes per square foot. The core was then rinsed in running water, acid-dipped in dilute sulphuric acid and rinsed again. It was then given a thin (about 0.0001 inch) copper plate from a cyanide solution under conditions known to result in a bright plate. Polishing of this copper layer was not found to be necessary. The core was then rinsed again in running water, struck with silver and then silver-plated to a thickness of approximately 0.0005 inch (the specified thickness of the silver lining) in the usual manner. Nickel was then plated over the silver to a thickness of about 0.025 inch.

At this stage the machining necessary to make the guide fit properly into its place in the final assembly, was done. The machined guide with the core still in place, was then cleaned and plated with cyanide copper to a thickness of about 0.0005 inch. The copper was then removed mechanically from those parts of the die cast core that were not covered by the nickel wall of the wave guide. The whole was then immersed in a solution containing approximately 20% by volume of technical hydrochloric acid which was maintained at a temperature of about 170° F. until the zinc based core was completely dissolved. The wave guide was then rinsed in running water and immersed in a solution containing about 50 grams of cupric sulfate ($5H_2O$) and 260 c.c. of ammonium hydroxide (28–29% $NH_3$) per liter, at a temperature of about 75 to 80° F. After the copper was dissolved from the interior and exterior surface of the wave guide, the inner surface of the silver lining was found to be free from copper and to have a smoothness and high finish not perceptibly less than that of the copper layer on which the silver was deposited.

*Example 2.*—A core of size and shape similar to that in Example 1 was formed of a fusible alloy having a melting point of about 167° F. and having approximately the following analysis:

| | Per cent |
|---|---|
| Bismuth | 50 |
| Lead | 35 |
| Tin | 9 |
| Cadmium | 6 |

After forming, the surface of this core was carefully smoothed and finished, and all discontinuities, pinholes, and other imperfections in the surface were eliminated, care being taken not to nick or unduly round the edges of the rectangular core. The core was then cleaned by scrubbing with diatomaceous earth and a mildly alkaline cleaning solution containing per liter about 50 grams of tetrasodium pyrophosphate, 5 grams of trisodium phosphate, and a small amount of a sodium salt of a sulfonated fatty alcohol. This solution was used warm but its temperature was kept well below the softening point of the core metal. After scrubbing, the core was rinsed in running water and then acid-dipped in dilute solution of hydrochloric acid, and again rinsed. It was then dipped for about one minute into a solution containing about 25 grams of sodium molybdate per liter in distilled water at a temperature of approximately 45° C. and a pH of about 6.0. It was then rinsed in water and flashed in a cyanide copper solution for approximately 10 seconds at a current density of about 30 amperes per square foot. This resulted in a deposit of copper adequate to cover the core completely but not sufficient to result in a blistered deposit. The core was again rinsed then plated with acid copper to a thickness of about 0.0005 inch, which in the present case was sufficient thickness to be mechanically polished, as an alternative to the deposition of a layer of bright acid copper. After copper plating, the core was thoroughly washed, dried, and polished, care being taken to avoid raising the temperature at any point to a degree which might soften the fusible core metal. It was then recleaned using the sequence of operations described. After recleaning, it was struck with silver and plated in the usual manner with silver until the specified thickness of 0.0005 inch of silver was secured. After rinsing and acid-dipping, nickel was deposited as in the previous example, to a thickness of about 0.025 inch. The plated core was then placed in water maintained well above the fusing temperature of the core metal, until the core had fused and run out of the tubular wave guide, and a jet of steam was applied to remove the last remaining droplets of core metal. To assure ready removal of the copper in the ensuing step, the wave guide from which the core had been removed was immersed for about 10 minutes in a concentrated solution of hydrochloric acid at room temperature. Thereafter the wave guide was immersed in a strongly ammoniacal solution of divalent copper as in the previous example to dissolve the copper from the inner surface. This left the surface of the silver with essentially the same high degree of finish as was provided on the copper plate which formed a basis for its deposition.

The product has been described as silver lined, silver being the lining material now commonly specified for wave guides. I do not mean to exclude products wherein the silver lining is itself lined with a protective layer to prevent tarnishing or for other purpose. Such protective layers over silver are sometimes formed of metals more noble than silver, commonly rhodium, palladium, and occasionally platinum or gold. Layers of this type can be provided in the products of the present invention by intercalating a step of electrodepositing the usually extremely thin layer of metal of this group between the formation of the highly finished copper layer and the subsequent electrodeposition of the silver lining. The term "silver lining" as herein used is to be understood to refer to the silver layer whether protected with a film of more noble metal or not.

Where, in the present specification and claims, the nickel or other metal forming the wall is described as deposited over the silver lining, it is not meant to exclude the deposition or presence of intermediate layers of other metal, as for example copper, which may be desired or specified for special purposes. Such layers when specified may be deposited over the silver lining in accordance with known methods of electrodeposition, and the wall metal may then be deposited thereover in the manner described.

The term "tinning" is used herein in the sense in which it is commonly understood in the soldering art. As so used it refers to the application to a metallic surface, by fusion, of a more or less thin adherent layer of a fusible metal or alloy. Although fusible alloys commonly contain greater or lesser amounts of tin, the word "tinning" as herein used is not to be understood as necessarily implying the presence of tin in the fusible metal, or as implying the presence or absence of any specific type of adhesion, such as for example alloying of the metals, where the fusible metal covers the metal to which it adheres.

The term "wave guide" as used herein denotes any tubular element adapted to guide electromagnetic waves in radar or other equipment, whether a complete guide or only a section of such guide, for assembly with other parts, to form a complete structure.

I claim:

1. Method of making tubular metallic wave guides, which comprises: forming a fusible metallic core; treating the core in a solution characterized by the presence of an acid radical containing a metal chosen from the class consisting of vanadium, chromium, molybdenum and tungsten; electrolytically forming thereover a layer of copper; electrodepositing thereover a layer of silver; electrodepositing a layer of nickel over said silver layer; fusing the core in situ and removing the core metal; cleaning out residual core metal; and thereafter chemically dissolving the copper layer in a strongly ammoniacal solution of divalent copper to leave the inner surface of the wave guide clean and smooth.

2. Method of making tubular metallic wave guides having a metallic member extending inwardly from the wall thereof at a specified location, which comprises: forming a relatively destructible metallic core; embedding the member which is to extend inwardly from the wall of the wave guide, in said core at the specified location, with the part which is to be attached to the wall of the wave guide protruding from the surface of said core a distance less than the specified thickness of the wave guide wall; electrolytically forming on the surface of said core a protective layer of copper with a continuous smoothly finished dimensionally accurate surface which constitutes a base for the electrodeposition of, and imparts surface finish and accuracy of form and dimension to, the innermost layer of metal in the wave guide electroform thereon; electrodepositing a layer of silver on said copper surface; electrodepositing a layer of nickel on said layer of silver; destroying said core in situ and removing it from the interior of the wave guide; protecting the inner surface of said silver layer against damage during said destruction and removal, by maintaining said continuous protective copper layer intact on said inner surface; and thereafter dissolving the copper to leave a smooth interior surface on the silver wave guide lining, and the inwardly extending member partially embedded in the wave guide wall.

3. Method of making tubular metallic wave guides, which comprises: forming a smooth surfaced, dimensionally accurate, destructible metallic core; electrolytically depositing thereover a dimensionally accurate continuous layer of bright copper not over about 0.0005 inch in thickness; electrolytically depositing, on the bright surface of said copper, the metal which is to constitute the innermost surface of said wave guide; electrolytically depositing the metal of the wave guide wall thereover; thereafter destroying the core in situ; removing the material of the core from the interior of the wave guide; during said destruction and removal, protecting the interior surface of said wave guide by maintaining said layer of copper intact; and subsequently chemically dissolving said protective layer of copper, to expose the protected bright inner surface of the wave guide.

4. The method of claim 3 wherein at least the initial portion of the said copper deposit is made from a cyanide copper plating bath.

5. Method of making tubular metallic wave guides, which comprises: forming a smooth surfaced, dimensionally accurate, destructible metallic core; electrolytically depositing thereover a dimensionally accurate continuous layer of bright copper, not over about 0.0005 inch in thickness; electrolytically depositing a layer of silver of substantially uniform thickness, not less than 0.0002 inch, on the bright surface of said copper; electrolytically depositing a much heavier layer of nickel thereover; thereafter destroying the core in situ; removing the material of said core from the interior of the wave guide; during said destruction and removal, protecting the inner surface of said silver layer by maintaining said layer of copper intact on said inner surface; and subsequently chemically dissolving said protective layer of copper in a strongly ammoniacal solution of divalent copper to expose the protected bright inner surface of said silver layer.

6. In the electroformation of tubular metallic bodies on fusible metal cores, wherein, after completion of the electroformation, the metal of the core is fused and removed from the interior of the body, the method of securing a smooth high finish on the interior surface to adapt the body for use as a wave guide, which comprises: protecting the innermost surface of the tubular body during fusion and removal of the core metal, by means of a continuous layer of copper electrolytically formed over the surface of the core, and serving as a cathode on which the metal forming said tubular body is deposited; protecting said layer of copper against being wetted and tinned by the fused core metal, by treating the surface of the fusible core, prior to deposition of said layer of copper thereon, with a solution characterized by the presence therein of an acid radical containing a metal chosen from the class composed of chromium, molybdenum, tungsten, and vanadium; and then, after removal of the core metal, chemically dissolving the copper layer from the innermost surface of the tubular body.

7. The method of claim 6, wherein the innermost surface of the tubular body is formed of silver and the solution of the copper is accomplished by use of a strongly ammoniacal solution of divalent copper.

8. Method of making tubular metallic wave guides, which comprises: forming a smooth surfaced, dimensionally accurate, fusible metallic core; treating the surface of said core with a solution characterized by the presence therein of an acid radical containing a metal chosen from the class consisting of chromium, molybdenum, tungsten, and vanadium; thereafter electrolytically forming over the treated surface of said core a layer of copper, imparting to the outer surface of said layer, a bright, smooth, high finish, and dimensions accurately corresponding to the required dimensions of the inner surface of the wave guide; electrolytically depositing a layer of silver over the surface of said layer of copper; electrolytically depositing a layer of nickel over the surface of said layer of silver; fusing the core in situ and removing the core metal while maintaining said layer of copper intact to protect the inner surface of said layer of silver; and thereafter chemically dissolving the copper from the inner surface of the silver to leave said inner surface clean, smooth, and bright.

9. The method of claim 8, wherein the dimensional accuracy is imparted to the surface of the copper layer by limiting the thickness of the copper deposit on the dimensionally accurate fusible core of less than 0.0005 inch.

10. Method of making a tubular metallic wave guide, which comprises: forming a destructible metallic core; electrolytically depositing copper on the surface of said core to form a continuous copper layer, which layer has a smooth, highly finished, dimensionally accurate surface, adapted to receive and impart form, dimensional accuracy, and a smooth, highly finished interior surface to the innermost layer of metal in a wave guide electrolytically formed on said core, and which layer is further adapted to protect the innermost surface of said wave guide during destruction and removal of the core; electrolytically depositing over the surface of said copper, a layer of silver which is to constitute the innermost lining of the wave guide; electrolytically depositing thereover, the metal of the wave guide wall; thereafter destroying the core in situ; removing the material of the core from the interior of the wave guide; during said destruction and removal, protecting the interior surface of the wave guide by maintaining said layer of copper intact until destruction of the core, and removal of the material thereof, has been accomplished; and subsequently chemically dissolving said protective layer of copper, to expose the protected highly finished inner surface of the wave guide.

11. The method of claim 10 wherein the metallic core is chemically soluble and wherein the destruction of the core in situ is accomplished by chemical solution of the core metal.

12. The method of claim 10 wherein the metallic core is chemically soluble, wherein the metal electrodeposited to form the innermost surface of the wave guide is silver, wherein the metal electrodeposited to form the wave guide wall is nickel, wherein a thin layer of copper is electrodeposited over the nickel, and wherein the destruction of the core in situ is accomplished by chemical solution of the core metal.

13. The method of claim 3 wherein the metallic core is chemically soluble and wherein the destruction of the core in situ is accomplished by chemical solution of the core metal.

WILLIAM B. STODDARD, Jr.

REFERENCES CITED

The following references are of record in the file of this patent:

UNITED STATES PATENTS

| Number | Name | Date |
|---|---|---|
| 602,212 | Dessolle | Apr. 12, 1898 |
| 850,912 | Edison | Apr. 23, 1907 |
| 898,404 | Edison | Sept. 8, 1908 |
| 1,014,603 | McPhayden et al. | Jan. 9, 1912 |
| 1,412,174 | Eustis et al. | Apr. 11, 1922 |
| 1,674,941 | Bart | June 26, 1928 |
| 2,001,998 | Bart | May 21, 1935 |
| 2,004,102 | Dickey | June 11, 1935 |
| 2,365,959 | Horwedel | Dec. 26, 1944 |
| 2,381,367 | Quayle | Aug. 7, 1945 |
| 2,451,341 | Jernstedt | Oct. 12, 1948 |

FOREIGN PATENTS

| Number | Country | Date |
|---|---|---|
| 230,456 | Great Britain | June 3, 1926 |

OTHER REFERENCES

Metal Industry (London), vol. 49, pp. 239–241, Sept. 4, 1936.